(No Model.)
H. REISERT.
LUBRICATOR.
No. 268,728. Patented Dec. 5, 1882.
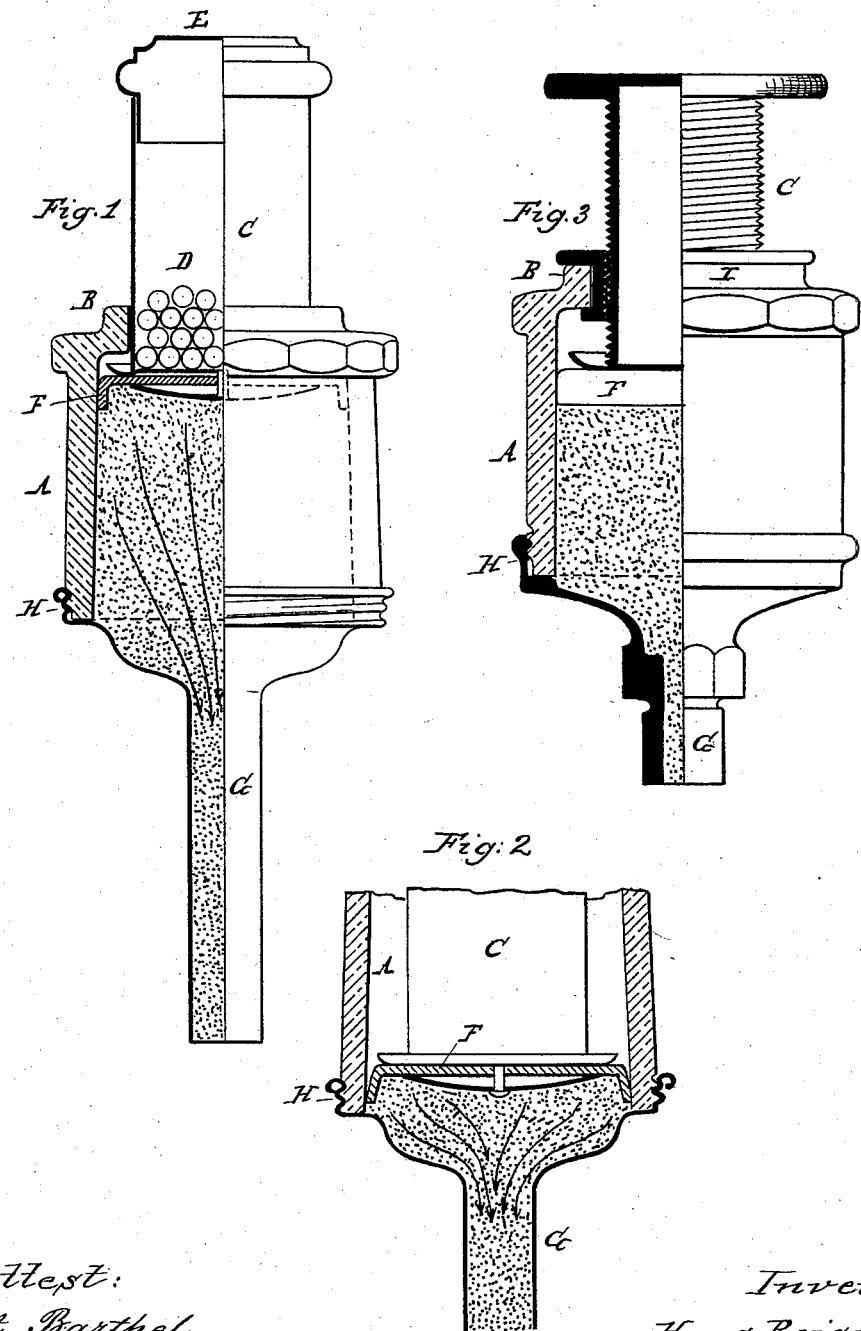
Attest:
A. Barthel
Inventor:
Hans Reisert:
per Thos. S. Sprague
Att'y

UNITED STATES PATENT OFFICE.

HANS REISERT, OF COLOGNE, GERMANY.

LUBRICATOR.

SPECIFICATION forming part of Letters Patent No. 268,728, dated December 5, 1882.

Application filed August 2, 1882. (No model.) Patented in France August 25, 1881, No. 144,533; in Germany December 6, 1881, No. 19,561; in England December 29, 1881, No. 5,706; in Austria-Hungary February 10, 1882, No. 41,603; in Sweden February 15, 1882, and in Belgium March 31, 1882, No. 57,350.

*To all whom it may concern:*

Be it known that I, HANS REISERT, engineer, in the city of Cologne, German Empire, have invented certain new and useful Improvements in Lubricators, of which the following is a specification.

The nature of this invention relates to certain new and useful improvements in lubricators, and the lubricator herein described belongs to that class of such implements which require a lubricant of the consistency of grease or fat.

The invention consists in the peculiar construction, arrangement, and operation of the various parts, as more fully hereinafter described.

Figure 1 is an elevation of my improved lubricator, partly in vertical section, showing the reservoir filled. Fig. 2 is a vertical central section, showing the reservoir nearly emptied. Fig. 3 shows a modification of the invention.

In the accompanying drawings, which form a part of this specification, A represents the reservoir for the reception of the lubricant. It is made of glass or other transparent material, screw-threaded upon its lower end, and terminating in a neck, B, at its upper end, through which the cylindrical plug C has a free vertical play. This plug may be solid; but it is preferably made, as shown, of sheet-metal tubing, and it is provided with a cap, E. The chamber D thus formed in the plug is intended for the reception of shot or other weighty substance. To the under side of the plug C is attached, in any convenient manner, a sabot, F, consisting of a soft and very elastic material—such as leather, for instance.

G is the discharge-tube. Its upper enlarged end is provided with a threaded flange, H, by means of which it is detachably secured to the lower end of the reservoir A.

In practice, the reservoir being filled with the lubricant, and the plug being properly weighted, if made hollow with the chamber D, as described, the pressure of the same will force the lubricant out of the reservoir, the escape of the lubricant only taking place while the shaft is revolving in the bearing to be lubricated, the lubricant being gradually and in small proportion removed by the revolving shaft from the discharge-tube and distributed along the journal. When the shaft is not revolving no lubricant can enter the bearing, as the pressure is not sufficiently large to overcome the resistance within the bearing. The use of the sabot F, with its downturned edges, prevents the lubricant from escaping above, and the pressure of the weighted plug, being transmitted through the semi-liquid lubricant, keeps the downturned edges of the soft and elastic sabot tightly pressed against the walls of the reservoir, and as there is but little friction no great weight is required to feed the lubricant, and the whole device is very simple and compact. The plug C acts as a guide for the descending sabot and forms the means of imparting the necessary pressure to discharge the lubricant. The refilling of the lubricator is easily effected by unscrewing the reservoir, upturning the same, and filling it with the lubricant after retracting the plug with the sabot. The lubricant used, being of the consistency of fresh butter, will allow the reservoir being again inverted and secured upon the discharge-tube.

Experience has demonstrated that with a lubricator such as above described the outflow of the lubricant is irregular, if the reservoir A is made of a cylindrical shape, it having been found that with the reservoir filled the lubricant is fed faster, the amount of feed growing less and less as the reservoir becomes empty. This is, first, owing to the constantly-diminishing weight of the lubricant as it grows less in quantity, and, secondly, to the increasing contraction or friction caused by the choking of the same at the discharge-opening, as is indicated by the arrows in the drawings. To obviate this defect, I make the reservoir A of a conical shape, with the larger section at the lower end, and by adopting a sabot of very soft and elastic material, free to expand within certain limits, I obtain a tight-fitting piston, whose friction with the reservoir-walls is constantly decreasing as it descends within the reservoir.

The friction of the sabot against the walls of the reservoir is made up of two factors. First, the sabot has a certain tendency to expand, independent of any other material, and which tends to flatten it out. The size of the sabot, being but little larger than the lower area of the reservoir, becomes compressed and cup-shaped when forced into the upper part of the reservoir, thereby exerting a certain pressure upon the walls of the same. The second factor of friction is caused by the lubricant pressing the downturned edges of the sabot against the reservoir-walls, and as these portions of the sabot decrease in area as the piston descends, owing to the conical shape of the reservoir, this friction diminishes in a similar degree as the other. The difference of friction of the sabot between its highest and lowest position in the reservoir depends therefor upon the conical shape of the latter, and in my improved lubricators the same is just calculated to be of the proper degree to compensate for the loss of pressure arising from the constantly-diminishing weight of the lubricant and the increased contraction or choking of the same at the discharge-inlet as its quantity decreases, and I have succeeded in making the discharge uniform from beginning to end. The conical shape of the reservoir also tends to keep the downturned edge of the sabot properly pressed against the wall of the reservoir to prevent the lubricant from forcing its way upward, and if the plug or piston C is forcibly withdrawn air will easily find its way past the edges of the sabot.

When this lubricator is not intended to be made self-feeding, then I provide the plug C with a screw-thread and secure a nut, I, in the neck of the reservoir, as shown in Fig. 3. Turning the plug will then force the lubricant through the discharge-tube onto the bearing, and in this modification the conical shape of the reservoir may be dispensed with.

When it is desired to use in my lubricators a lubricant of a low point of liquefaction, a piece of metal rod is introduced into the discharge-tube, and the feeding is then brought about by the successive melting down of the lubricant, owing to the production of heat by the frictional contact of the metal rod against the revolving shaft.

What I claim as my invention is—

1. In a lubricator, the sabot F, consisting of a soft and elastic material, in combination with a plug, C, passing through the neck of the lubricator, substantially as and for the purposes described.

2. In a lubricator, a conically-enlarged reservoir, with the larger section thereof at the bottom, in combination with a piston, the frictional contact of which with the reservoir decreases during its descent, substantially as and for the purposes set forth.

3. In a lubricator, the conically-enlarged reservoir, in combination with the soft and elastic sabot F, attached to the lower end of the hollow plug C, passing through the neck of the reservoir and provided with an inclosed chamber, D, adapted to receive a variable weight, substantially as and for the purposes described.

4. In a lubricator, and in combination with the reservoir adapted to be readily disconnected from the discharge-tube, a plug or piston provided at its under side with a soft and elastic sabot, and, passing through the neck, with or without screw-threading, forming an actuating-head for the discharge of the lubricant, substantially as described.

In testimony that I claim the foregoing as my invention I have signed my name in presence of two subscribing witnesses.

HANS REISERT.

Witnesses:
CARL ROCHELS,
HEINRICH HEDDING.